United States Patent
Song

[11] Patent Number: 6,131,564
[45] Date of Patent: Oct. 17, 2000

[54] WATERING MEANS FOR A FRYER

[76] Inventor: Young Joo Song, 97-64 Eungam-Dong, Eunpyung-Ku, Seoul, Rep. of Korea

[21] Appl. No.: 09/410,277

[22] Filed: Sep. 30, 1999

[30] Foreign Application Priority Data

Apr. 9, 1999 [KR] Rep. of Korea ............... 99-12609

[51] Int. Cl.[7] .................................................. A47J 27/026
[52] U.S. Cl. .................................... 126/391.1; 126/376.1; 99/408
[58] Field of Search ................ 126/391.1, 350 R, 126/345, 392, 392.1, 373.1, 375.1, 376.1; 99/403, 408, 316, 415; 219/438; 210/540

[56] References Cited

U.S. PATENT DOCUMENTS

| | | | |
|---|---|---|---|
| 4,580,549 | 4/1986 | Sato | 126/391 |
| 4,603,622 | 8/1986 | Beck | 99/408 |
| 5,632,266 | 5/1997 | Sato | 126/391 |

*Primary Examiner*—James C. Yeung
*Attorney, Agent, or Firm*—George L. Boller

[57] ABSTRACT

This invention relates to a watering means for a fryer to supply suitable moisture required during frying operation. A fryer including a watering means for a fryer according to the invention comprises a heating device such as a heating pipe or a heater for heating oil in frying vessel to a temperature suitable for frying food, a net positioned above said heating means and a bottleneck-shaped accumulating portion positioned at lower portion of the fryer vessel to collect bits of fried batter. An injector having a plurality of perforation is provided in the frying vessel to supply water or vapor to frying oil.

12 Claims, 5 Drawing Sheets

WATERING MEANS FOR A FRYER

BACKGROUND OF THE INVENTION

This invention relates to a watering means for a fryer to supply a suitable moisture required during frying operation.

U.S. Pat. No. 4,580,549, Japanese Pat. No. 1,046,414 and Korean Pat. No. 90-271 teach a conventional fryer having a frying vessel in which frying oil and water are placed, allowing the oil to rise above the water due to the difference in specific gravity between oil and water and thus an oil bath is positioned in the upper portion of the vessel and a water bath is positioned in the lower portion of the frying vessel.

It is the ordinary method of frying with conventional fryers to heat frying oil in the upper portion of the frying vessel and put the material to be fried into the oil after the oil has been heated to appropriate temperature for frying. According to the Korean Pat. No. 90-271, one of the conventional fryers, the frying vessel has a flange at upper portion thereof and is supported in a suspended manner by a frame to constitute the fryer, and a heating device is provided extending through front and rear side walls of the frying vessel, near the boundary between oil bath and water bath.

A gas burner is set for each of the heating pipes, the rear end of each heating pipe being connected into a stack so that the flame of a burner is guided toward the stack from a combustion chamber and through each heating pipe to heat said heating pipe, thereby heating the oil in oil bath.

Also, air intake pipes are provided laterally spaced equidistant from each other, said air intake pipes being disposed below said heating pipes and extending through front and rear side walls of the frying vessel like the heating pipes.

The rear end of each said air intake pipe is connected to the stack, the interior of which is sectioned by a partition plate into two portions, said air intake pipe being communicated to the atmosphere through said stack separately from the discharge from each said heating pipe.

Water below an oil bath is intended to supply a suitable moisture required during frying operation, and bits of fried batter must be settled down in the water bath to prevent oxidation of oil.

Accordingly, it is necessary to cool the area near the boundary between frying oil and water to prevent said bits of batter from floating up into the oil and to inhibit water from being overheated and causing explosion. But it has been found that using a plurality of air intake pipes to cool the boundary area between the water and the oil results in a high cost for fabrication of the fryer because these cooling pipes are each welded individually to the external wall of the oil bath.

Additionally, the plurality of the pipes makes cleaning of the interior of the frying vessel difficult because of the number and closeness of the cooling pipes to each other and to the side wall of the frying vessel itself.

Furthermore, since the cooling of the water is effected by air passing through the cooling pipes, long use of a fryer does heats indoor temperature to the degree not to ensure sufficient cooling of the water, and thereby the water in frying vessel will come to explosion, injuring a worker.

SUMMARY OF THE INVENTION

The present invention is proposed to solve the above problem, and the object of the invention is to provide a watering means for a fryer that can supply water without the possibility of explosion of the water by overheat.

The description of primary reference numbers are as follows:

| 1 | frying vessel | 3 | heating pipe |
|---|---|---|---|
| 4 | power source | 5 | net |
| 6, 6' | injector | 7 | storage tank |
| 7' | auxiliary tank | 8 | connecting pipe |
| 9 | valve | 41 | heater |
| 71 | stopper | 73 | orifice |

DESCRIPTION OF THE EMBODIMENT

To achieve the above object, a fryer including a watering means for a fryer according to the invention comprises a heating means such as a heating pipe or a heater for heating oil in frying vessel to a temperature suitable for frying food, a net positioned above said heating means and a bottleneck-shaped accumulating portion positioned at lower portion of the fryer vessel to collect bits of fried batter.

An injector having a plurality of perforations is provided in the frying vessel to supply water or vapor to frying oil.

Also, the fryer is equipped with a tank to store and supply water through a connecting pipe and the injector during frying operation.

A valve may be provided to the connecting pipe in order to control the amount of water to be supplied to the injector.

In case the tank containing water is designed to be partially contacted with the frying vessel or to surround it, water will absorb the heat from frying oil to be vaporized, and thereby frying oil is provided with vapor rather than water.

The invention will be described below by way of its preferred embodiments with reference to the accompanying drawings.

Figure 1:
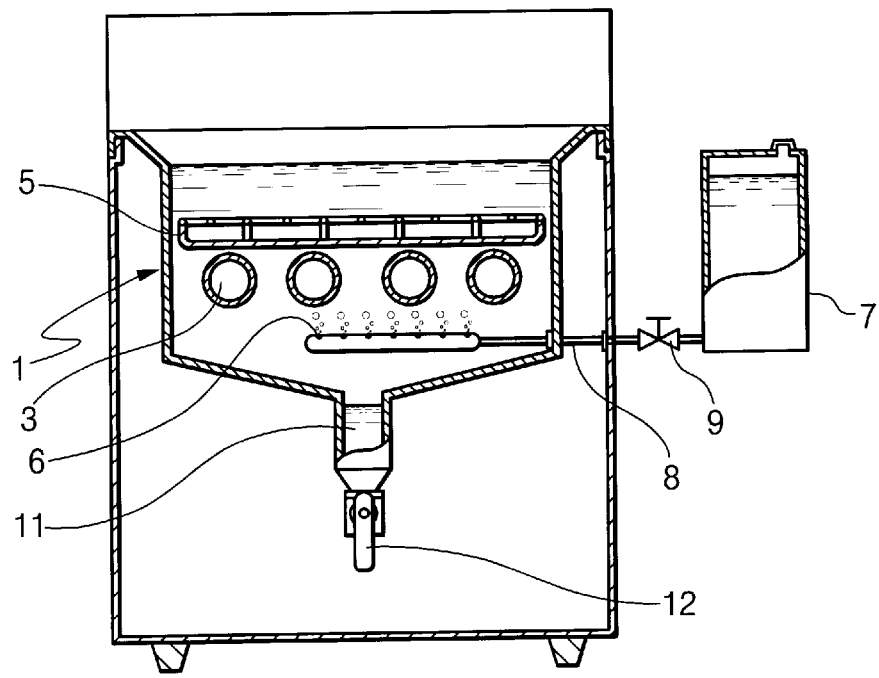
FIG. 1 is a vertical cross-sectional view of a watering means for a fryer according to the first embodiment of the invention.

Referring to FIG. 1, a watering means for a fryer according to the invention is combined with a fryer comprising a frying vessel (1) having a circular or polygonal open top and containing a frying oil, a plurality of heating pipes (3) extending horizontally through front and rear side walls in the middle portion of the frying vessel (1) so that the flames of burner (not shown) will be guided to heat the frying oil to a temperature suitable for frying food, or a heater (41) electrically connected to a power source (4), a net (5) positioned above the heating pipes (3) or the heater (41), a bottleneck-shaped accumulating portion (11) positioned at lower portion of the frying vessel for collecting bits of fried batter, and a drain cock (12) for draining the bits of fried batter accumulated in the accumulating portion (11).

A watering means according to the invention includes injector (6) received in the frying vessel (10), a storage tank (7) containing water and a connecting pipe (8) connecting the injector (6) to the storage tank (7).

The shape of the injector (6) may, as shown in FIG. 8a to FIG. 8d, be an elongate bar or a rectangle with circular cross-section configuration in accordance with that of the fry vessel (10), and many perforations (61) are formed on the surface of the injector (6) to inject water into the frying oil. The injector (6) may be made of metallic or nonmetallic material such as elvan or ceramics.

The diameter of the perforation (61) is about 0.2 mm~3 mm, however, the number and diameter are not limitative so far as the perforations (61) can serve as a passage for suitable water flow from the connecting pipe (8) therethrough into the fry oil.

The amount of water discharged from the perforations (61) is equal to that of water contained in the frying oil, whereby the frying oil can maintain the suitable amount of water for good frying condition.

Since the amount of water supplied into the frying oil is little, although it is heated during passing through the frying oil, there is no possibility of explosion thereof.

Figure 7:
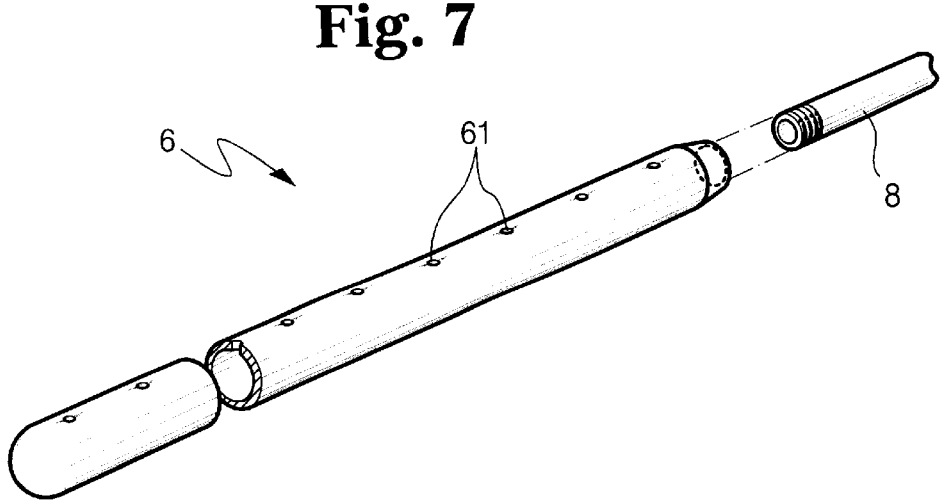
FIGS. 7, 8, 9, and 10 each is a view of a injector of the watering means for a fryer according to the invention.
Figure 8:
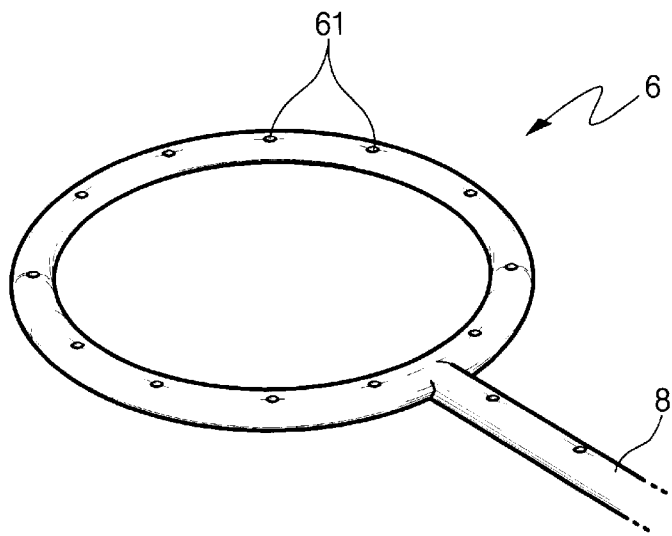
Figure 9:
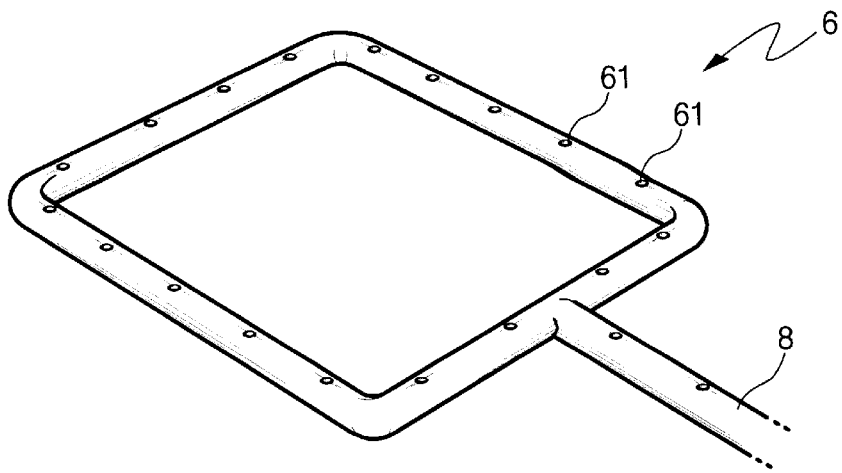
Figure 10:
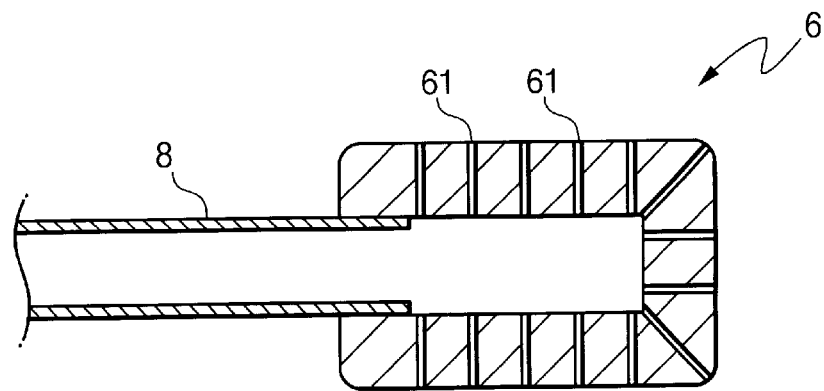
Figure 11:
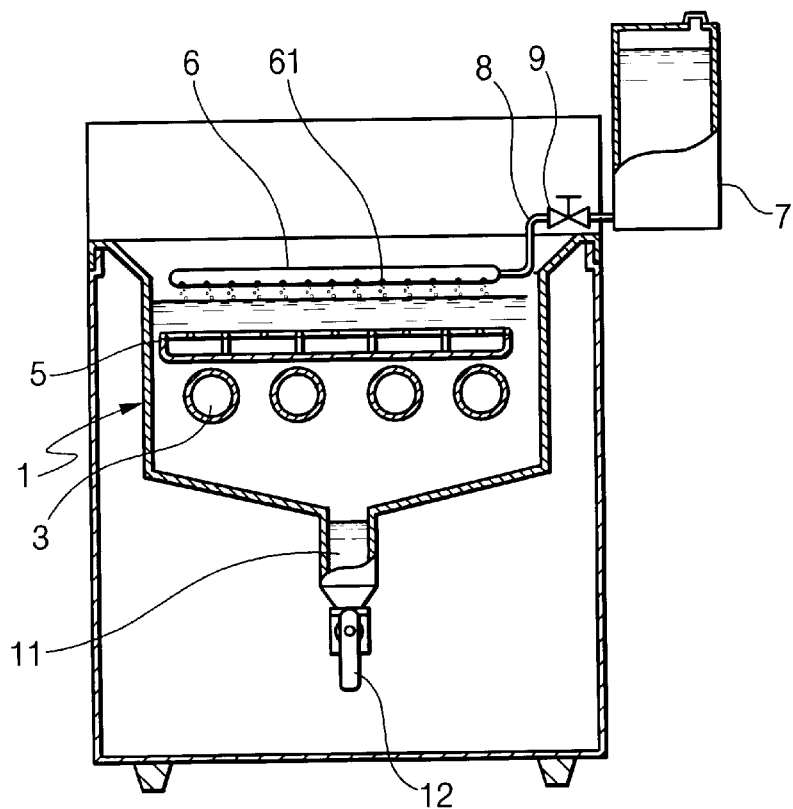
FIG. 11 is a vertical cross-sectional view of a watering means for a fryer according to the seventh embodiment of the invention.

The injector (6) having a plurality of the perforations (61) is preferably arranged to horizontally extend within frying oil, however, it also may be arranged to vertically extend within frying oil or to parallel the level of frying oil as shown in FIG. 7.

Furthermore, instead of water, vapor from the storage tank (7) can be supplied into frying oil through an injector (6').

The storage tank (7) is a tank for storing water and, partially or entirely, made of a transparent plastics so that a worker can monitor the level of water.

Figure 4:
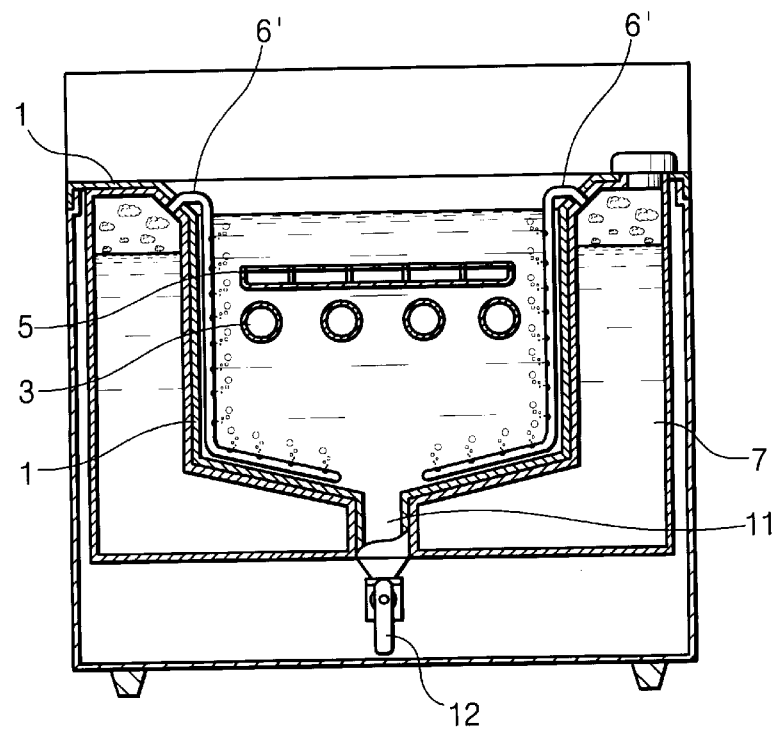
FIG. 4 is a vertical cross-sectional view of a watering means for a fryer according to the fourth embodiment of the invention.

Furthermore, the storage tank (7) may be made of metallic material in the case of surrounding the frying vessel (1), as shown in FIG. 4, whereby the storage tank (7) can supply vapor to the frying oil through the injector (6') by evaporation of water.

The connecting pipe (8) serves as a passage that water or vapor from the storage tank (7) or (7') passes through, and may be arranged to pierce the side wall of the frying vessel (1) or to be adjacent to the surface of the frying oil, which enables water or vapor to be supplied without modification of the frying vessel (1).

In the middle of the connecting pipe (8) a manual or automatic valve (9) may be provided for controlling the amount of water passing therethrough.

<embodiment 1>

FIG. 1 is the first embodiment of the invention and illustrates a fryer comprising a watering means for a fryer.

The storage tank (7) is provided externally on the frying vessel (1), and the connecting pipe (8) joins the injector (6) to the storage tank (7), and thereby water is supplied to the frying oil through the connecting pipe (8) and the perforation (61) of the injector (6), correspondingly to the openness of the valve (9) mounted on the connecting pipe (8).

The amount of water supplied to the frying oil is controlled proportionally to that of frying oil by the valve (9), operated by hand or an automatic controller (not shown ), since more frying oil needs more moisture.

<embodiment 2>

Figure 2:
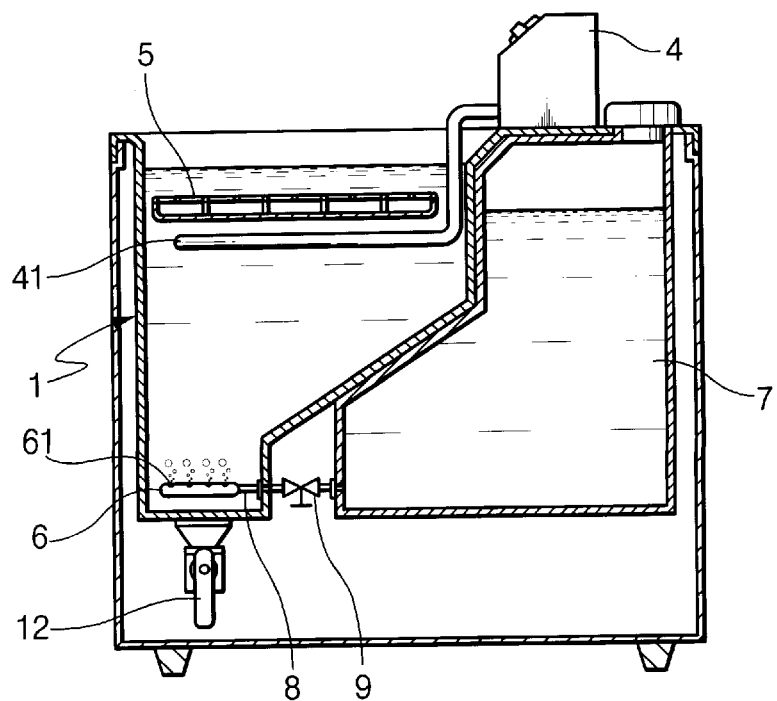
FIG. 2 is a vertical cross-sectional view of a watering means for a fryer according to the second embodiment of the invention.

FIG. 2 is the second embodiment of the invention and the structure of a watering means for a fryer is equal to that of FIG. 1 with the exception that the storage tank (7) is provided to be contacted with one side of the frying vessel (1). This arrangement makes the external shape simple and will offer convenience in use and maintenance.

<embodiment 3>

Figure 3:
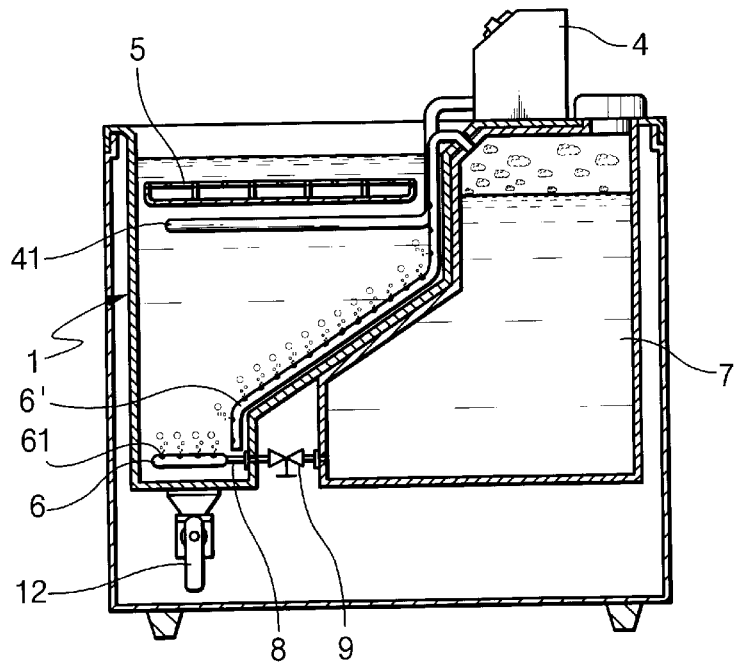
FIG. 3 is a vertical cross-sectional view of a watering means for a fryer according to the third embodiment of the invention.

FIG. 3 is the third embodiment of the invention and the structure of a watering means for a fryer is equal to that of FIG. 2 with the exception that the injector 6' is provided to supply vapor generated in the storage tank 7 due to heat transferred from frying oil having a temperature of around 200° C.

<embodiment 4>

FIG. 4 is the fourth embodiment of the invention and illustrates that the storage tank 7 is surrounding the outer periphery of the frying vessel 1. This structure will promote the evaporation of water in the storage tank 7 by extended contact area between the storage tank 7 and the frying vessel 1.

<embodiment 5>

Figure 5:
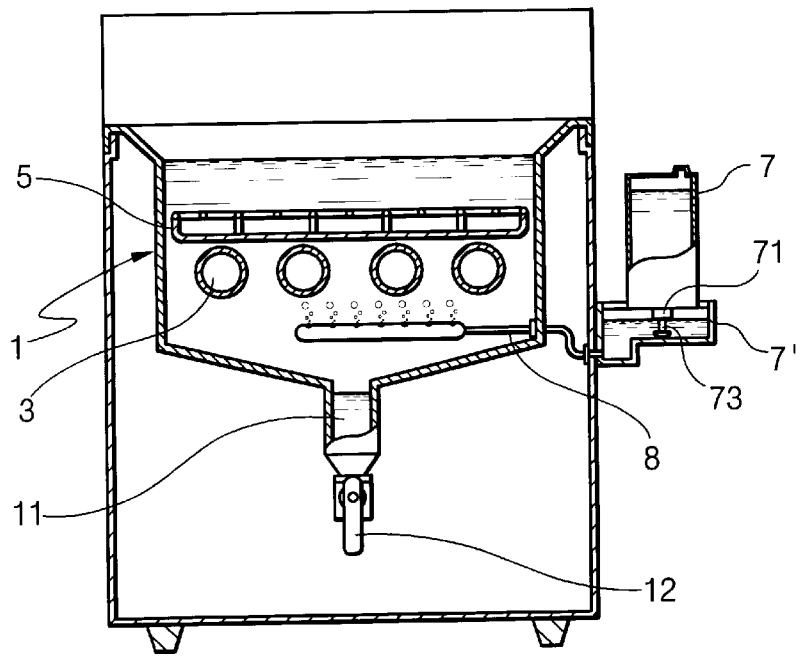
FIG. 5 is a vertical cross-sectional view of a watering means for a fryer according to the fifth embodiment of the invention.

FIG. 5 is the fifth embodiment of the invention. In this embodiment, an auxiliary tank 7' with a stopper 71 is provided on the storage tank 7 to automatically and continuously compensate for the amount of water discharged from the storage tank 7. In more detail, as shown in the FIG, since the opening 73 formed on the stopper 71 is positioned to have the same level as that of the injector 6, the complementary water is simultaneously supplied to the auxiliary tank 7' from the storage tank 7 when water in the auxiliary tank 7' flows out.

<embodiment 6>

Figure 6:
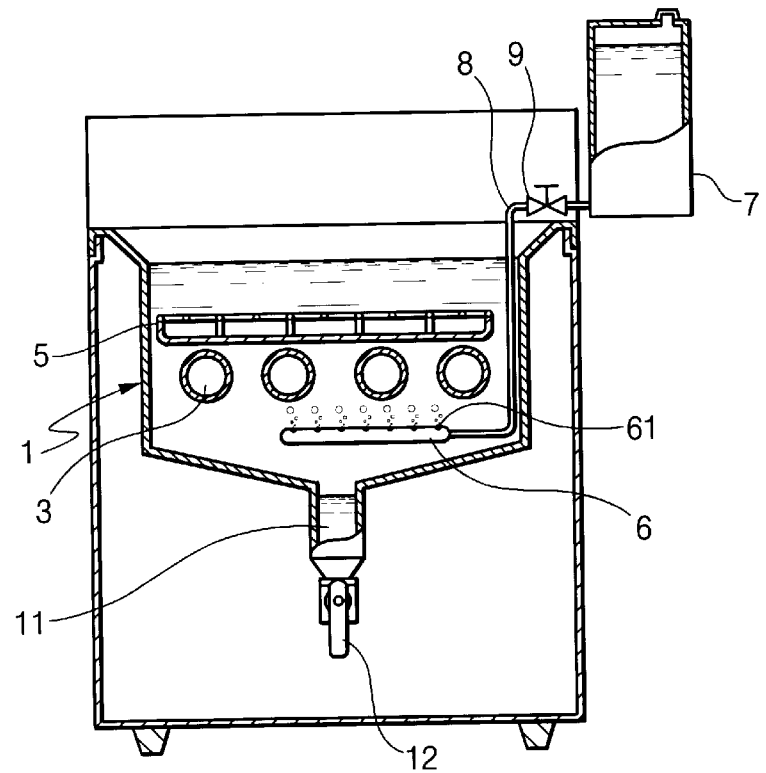
FIG. 6 is a vertical cross-sectional view of a watering means for a fryer according to the sixth embodiment of the invention.

FIG. 6 is the sixth embodiment of the invention and illustrates that the connecting pipe 8 is provided through the open top not the side wall, of the frying vessel 1. This embodiment has an advantage that a watering means for a fryer can be provided to a conventional fryer without modification of structure thereof.

<embodiment 7>

FIG. 7 is the seventh embodiment of the invention. In this embodiment, a watering means for a fryer has the same component as that of FIG. 6, however, the injector 6 is disposed to be adjacent to the surface of frying oil while the injector 6 of FIG. 6 is disposed in frying oil. Water from the injector 6 is sprinkled on the surface of frying oil and then mingled with frying oil by convective operation of heated frying oil.

This embodiment make it possible to supply water to frying oil without modification of fryer's structure, similarly with FIG. 6, and thereby there is no additional cost for providing a watering means to a conventional fryer. Also, although water is supplied to frying oil in this embodiment, however, instead of water, vapor can be supplied to the surface of frying oil. Furthermore, besides the above embodiment, the present invention further comprises other embodiments in which a particle of water generated by an ultrasonic generator or a vibrator is supplied to frying oil.

Changes or modification may be made in the construction and the arrangement of the parts as disclosed herein without departing from the spirit and scope of the invention as defined in the following claims.

What is claimed is:

1. A fryer comprising a frying vessel for holding frying oil, a heating means for heating the frying oil, a net disposed within said frying vessel, said frying vessel having an accumulating portion into which bits of fried batter can drop and collect, and a watering means for the fryer comprising a source of water, an injector having a plurality of perforations arranged to deliver water from said water source to flying oil in said frying vessel, and a connecting pipe connecting said injector to said water source for supplying water from said water source to said injector so that said injector can deliver water to frying oil in said frying vessel.

2. A fryer according to claim 1 including a valve for controlling the amount of water passing through said connecting pipe.

3. A fryer according to claim 1 wherein said injector is arranged to be adjacent the surface of frying oil in said frying vessel.

4. A fryer according to claim 1 wherein said water source comprises a storage tank disposed in contact with a side of said frying vessel so that water in said storage tank will be vaporized by heat transferred from frying oil in said frying vessel, whereby vapor is supplied to the frying oil by said injector.

5. A fryer as claimed in any one of claims 1 to 4 wherein said injector is made of metallic material.

6. A fryer according to claim 1 wherein said water source comprises a storage tank arranged to surround the outer periphery of said frying vessel.

7. A fryer as claimed in any one of claims 1 to 4 wherein said injector is made of nonmetallic material.

8. A fryer according to claim 1 in which said connecting pipe is arranged to enter said frying vessel through an opening in a side wall of said frying vessel.

9. A fryer according to claim 1 in which said connecting pipe is arranged to enter said frying vessel through an open top of said flying vessel.

10. A fryer according to claim 1 in which the heating means comprises a plurality of heating pipes passing through said frying vessel.

11. A fryer according to claim 1 in which the heating means comprises a heater disposed within said flying vessel.

12. A fryer comprising a frying vessel for holding flying oil, a heating means for heating the flying oil, a net disposed within said frying vessel, said frying vessel having an accumulating portion into which bits of fried batter can drop and collect, and a watering means for the fryer comprising an injector having a plurality of perforations and arranged to deliver water from said auxiliary tank to frying oil in said flying vessel, a main storage tank for storing water, an auxiliary storage tank receiving water from the main storage tank, a stopper for compensating for the amount of water discharged from said main storage tank, and a connecting pipe connecting said injector to said auxiliary tank.

* * * * *